United States Patent [19]
Slutsky

[11] 3,737,767
[45] June 5, 1973

[54] TRAILER TESTING APPARATUS

[76] Inventor: Robert Slutsky, 216 Dellwood Road, Metuchen, N.J. 08840

[22] Filed: Dec. 17, 1971

[21] Appl. No.: 209,113

[52] U.S. Cl. .................................... 324/51, 324/73
[51] Int. Cl. ............................................. G01r 31/02
[58] Field of Search .................... 324/51, 52, 73, 149

[56] References Cited
UNITED STATES PATENTS

| | | | |
|---|---|---|---|
| 3,663,939 | 5/1972 | Olsson | 324/51 XR |
| 3,535,638 | 10/1970 | Michelin | 324/149 |
| 1,630,592 | 5/1927 | Weston | 324/149 |
| 3,579,100 | 5/1971 | Lauver | 324/53 |
| 3,103,808 | 9/1963 | Eichelberger | 324/51 XR |
| 3,428,888 | 2/1969 | Nolte | 324/51 |
| 3,417,326 | 12/1968 | Harris | 324/51 |

Primary Examiner—Gerard R. Strecker
Attorney—Stefan J. Klauber

[57] ABSTRACT

Apparatus for testing the electrical circuitry of trailers of the type utilized in the trucking industry. The highly portable apparatus is operable from line current via a step-down transformer, or may utilize an accompanying battery, and includes a generally rectangular, enclosed chassis, one side of which carries a plurality of switches for actuating the circuits being tested. A bayonet connector projects from the opposite side of the chassis and is utilized to secure the test apparatus to the front end of a trailer being tested, by mating such connector with the receptacle at such trailer normally used for effecting connection to the tractor electrical cable. The mating of connector and receptacle provides electrical connections for the circuits being tested, physically supports the test apparatus in operative position, and assures positive grounding of the test apparatus to the trailer body.

6 Claims, 5 Drawing Figures

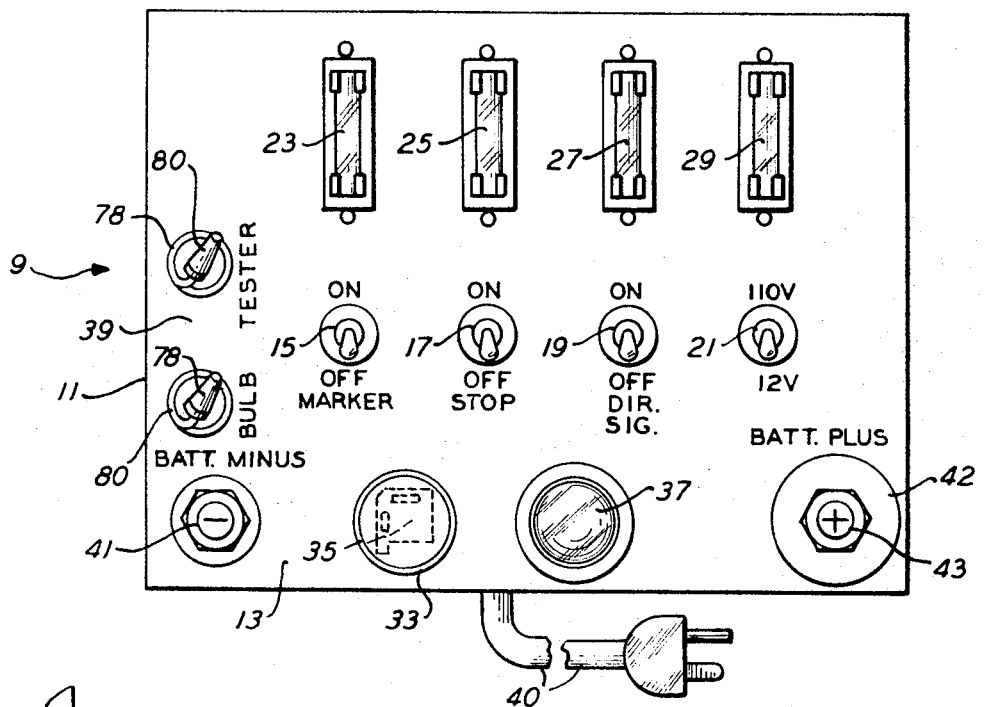
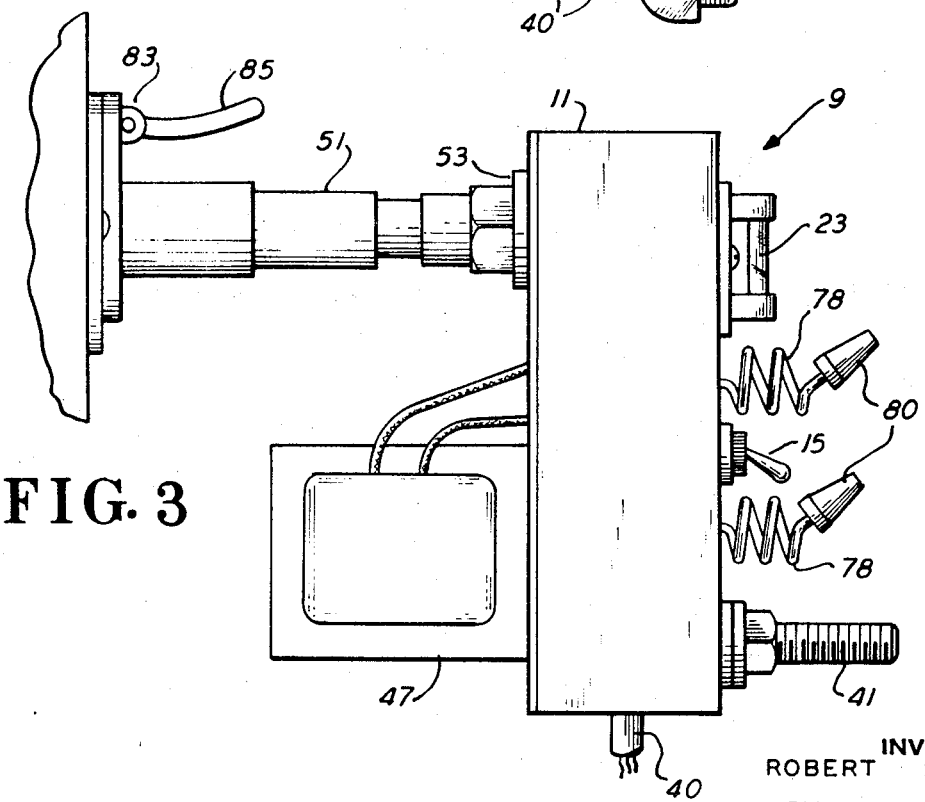

Patented June 5, 1973

INVENTOR
ROBERT SLUTSKY

BY Stefan J. Klauber
ATTORNEY

TRAILER TESTING APPARATUS

BACKGROUND OF INVENTION

This invention relates generally to testing apparatus, and more specifically relates to apparatus for testing the operability of the various lighting and signal circuitry incorporated into trailers of the type utilized in the tractor trailer industry.

The large, high capacity trailers, of the type commonly utilized in the tractor-trailer industry, include a relatively sophisticated electrical lighting system, which runs throughout the length of the trailer and is intended to provide at the rear of the trailer body both stop and directional lights, and as well a series of marker lights extending about the periphery of the trailer so as to dilineate the boundaries of the trailer. Various governmental regulations require that all of the aforementioned lights, which is to say the stop and directional signals, and the marker lights, be at all times operative, in order to provide full safety precautions both for the public at large as well as for the operators of the trailers. It is accordingly standard practive in the trailer industry to periodically check the various lighting systems in order to assure that all trailer lights are working properly, before the vehicle is utilized in hauling.

Trailers of the foregoing type, however, normally carry no power supply of their own, but rather depend for all power requirements upon the tractor with which such trailer is associated during the hauling operation. In practice, such feature renders testing of the electrical lights at the trailer a difficult operation. This is true in that such testing operations are commonly desired to be performed while the trailers are present at a terminal or trucking yard, during which period the trailers are normally disassociated from the tractor. It has, for such reason, been common practice to back a tractor up to a particular trailer desired to be tested, make the appropriate connections between the power cable of the tractor and the receptacle at the front end of the trailer, and then proceed to examine the various circuits, utilizing the tractor itself as a source of power and switching for the circuits to be inspected. When one considers the relatively enormous cost of a modern tractor, not to mention the time, effort and degree of safety risk involved in moving such tractor about the storage yard and making the appropriate connections and so forth, it becomes evident that a vast waste of time, facilities and manpower is involved in such procedures.

In an effort to alleviate the foregoing problem, testing apparatus have been proposed which provide self-contained switching circuits and power sources directly connectable to the trailer. In one such device, for example, suitable circuitry is mounted on a wheeled cart, together with a storage battery, and various other components intended for use in testing the pneumatic system of the trailer. The said device remains, unfortunately, extremely cumbersome, of limited portability, and is therefore sufficiently unattractive as to not have received a wide degree of acceptance. In other instances, apparatus have been proposed, which while more highly portable than devices of the foregoing type, nevertheless present safety hazards. This occurs because, in numerous instances, the proposed apparatus includes makeshift grounding arrangements, resulting in a potential hazard to the user thereof.

In accordance with the foregoing, it may be regarded as an object of the present invention to provide apparatus for testing the lighting circuitry of trailers, which is capable of rapidly and effectively testing all of the lighting circuitry associated with such trailer, and which is moreover highly portable and completely safe to use.

It is a further object of the present invention, to provide highly portable apparatus for testing the lighting circuitry of trailers, which may safely operate from line power, and which is so connected to the trailer tested that positive grounding is achieved.

It is a further object of the present invention to provide apparatus for testing trailer lighting, which is so configured as to make positive electrical and physical connection to the said trailer, during the course of which the operative switches and indicators are automatically positioned in the proper direction for operator access.

SUMMARY OF INVENTION

Now in accordance with the present invention, the foregoing objects and others as will become apparent in the course of the ensuing specification, are achieved in a highly portable apparatus operable from line current via a step-down transformer, or alternatively operable by an optionally accompanying battery. The test apparatus includes a generally rectangular enclosed chassis, one face of which carries a plurality of switches for actuating the circuits being tested, as well as a directional signal light indicator and a receptacle for a flasher associated with the appropriate circuits being tested. A bulb testing station is also present at such face and includes a pair of accessible terminals to which direct connection may be made by a bulb being tested by the operator. A bayonet connector projects from the opposite side of the said chassis and is utilized to secure the apparatus at the front end of a trailer being tested by mating such connector with the trailer receptacle normally utilized for effecting connection to the tractor electrical cable. The mating of connector and receptacle effects electrical connection for all circuits being tested, and as well physically supports the test apparatus in operative position. At the same time, the said connection between bayonet connector and trailer receptacle, assures positive grounding of the test apparatus of the trailer body.

BRIEF DESCRIPTION OF DRAWINGS

The invention is diagrammatically illustrated by way of example in the drawings appended hereto in which:

FIG. 1 is a top plan view of apparatus in accordance with the present invention;

FIG. 3 is a side elevational view of the said apparatus, illustrating the apparatus in position at the receptacle carried by the front end of a trailer being tested by the said apparatus;

DESCRIPTION OF PREFERRED EMBODIMENT

Figure 2:
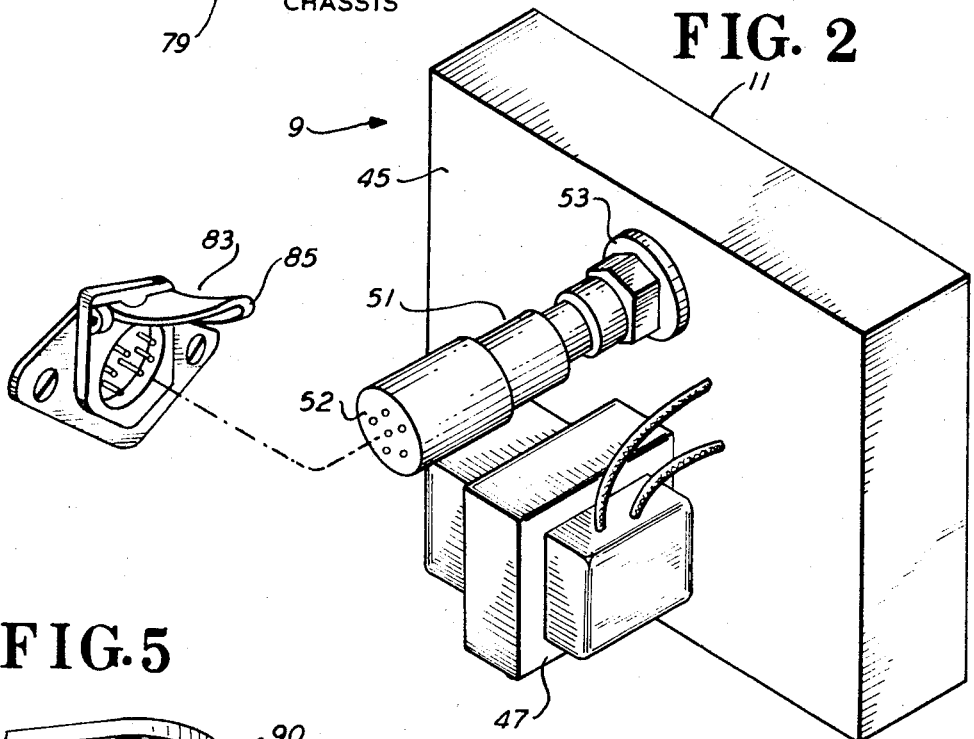
FIG. 2 is a bottom perspective view of the apparatus set forth in FIG. 1.

The general configuration and external structure of exemplary apparatus in accordance with the invention is set forth in the plan, perpsective and elevational views of FIGS. 1 through 3 herein. As seen therein, the apparatus generally designated at 9, includes a boxlike chassis 11 containing the various internally wired connections of the device. The broad upper face 13 of chassis 11 contains the various switches and other components observed and utilized by the user in the course of performing tests on a given trailer. More specifically, the face 13 includes mounted thereupon a series of toggle swtiches 15 through 21; a series of four fuses—23, 25, 27 and 29, associated with each of the four underlying switches; a receptacle 35 for receiving a standard flasher unit 33 therein; a signal bulb 37 mounted in an underlying receptacle not apparent in the Figures, and a bulb-testing station generally designated at 39. A pair of connecting terminals 41 and 43 are provided at each edge of the face 13, the said terminals being utilized for connecting a standard storage battery, which may optionally be used to power the present apparatus. The ungrounded terminal 43 may be insulated from chassis 11 by a washer 42 of rubber or the like.

As is evident from the markings thereupon, the series of toggle switches 15 through 21 are associated with particular functions of the apparatus 9. Thus, for example, switch 15 is associated in its upper or "ON" position with testing of the "MARKER" lights of the trailer. Similarly, switch 17 is associated with testing of the "STOP" light portion of the trailer electrical system. Switch 19 is associated with the testing of the directional signals of the said trailer. As will be further discussed in connection with the schematic diagram of FIG. 4, the said switch 19 also closes a parallel branch to ground including signal light 37 and flasher 33, so that closing of switch 19 not only enables directional light testing, but alternatively, one may, by changing flashers in the underlying receptacle 35, utilize the arrangement for testing of flasher units per se. Finally, at reference numeral 21, a switch is provided for electrically connecting the apparatus 9 so that power for the testing operation may be derived either from a self-contained transformer operating from line power or alternatively, from battery power supplied to the terminals 41 and 43, the one or the other configuration being achieved in consequence of the position of the toggle switch 21.

As may be best seen from the views of FIGS. 2 and 3, the back face 45 of apparatus 9 carries a step-down transformer 47 adapted to receive line current via conductor 40 at 110 to 120 volts, and step such potential down to test potential of the order of 12 to 15 volts. The said transformer may, if desired, be mounted internally of chassis 11. However, it is preferable for the transformer to be externally mounted in order to prevent the heating affecting various connecting wires within the said chassis, thereby prolonging the operative life of the apparatus. A suitable open-work cage (not shown) may cover the back face 45 of the apparatus, including said transformer 47, to provide a more attractive unit and also reduce the possible risk of damage to the transformer in the course of handling the apparatus. Projecting from the back face 45 of apparatus 9, is a bayonet connector generally designated at 51. The said connector 51 projects a distance of the order of 4 to 5 inches of the back surface of apparatus 9 and, as best seen in FIG. 3, thus projects well beyond the transformer 47. Bayonet connector 51 is firmly secured at its base flange 53 to the underlying surface of chassis 11 as for example by rivets or threaded fasteners or the like passing through the flange and through the underlying metal of the chassis plate. The said connector terminates in a standard female connector end 52, typically of the six-pin receiving variety which is adapted to mate with the standard pin-containing receptacle 83 present at the front end of trailers commonly utilized in the tractor trailer industry. The connecting end 52 of such bayonet connector 51, thus for example, may correspond in electrical configuration to the standard connector of this type available under the designation "Shur-Lock" from the Berg Manufacturing Company of Chicago, Ill. It may be pointed out in this same connection that there are presently in general use throughout the United States, two sizes of receptacles upon the trailers commonly utilized in the industry. The two differ with respect to number of connecting pins and cross sectional area. The connector 51 may typically comprise, as has been indicated, a configuration adapted to mate with the first mentioned of these two receptacles. However, a suitable adaptor, as is known in the connector art, may be readily provided between connector and receptacle in order to enable the present device to be utilized with either of the aforementioned receptacles. As will be further described in connection with FIG. 5 herein, an important feature of the invention resides in the fact that the apparatus 9 may via connector 51 be directly secured to the receptacle 83 at the front end of the trailer being tested and that upon such connection, not only is electrical connection effected, but moreover, physical support for the apparatus in the test position is enabled. Here it may be noted that use of an adaptor, as just cited, in no way affects the support function in that the said adaptors, as for example, such model as is available under the designation "Shur-Lock" from the aforementioned company, still provide fully sufficient rigidity for performing the support function mentioned.

Figure 4:
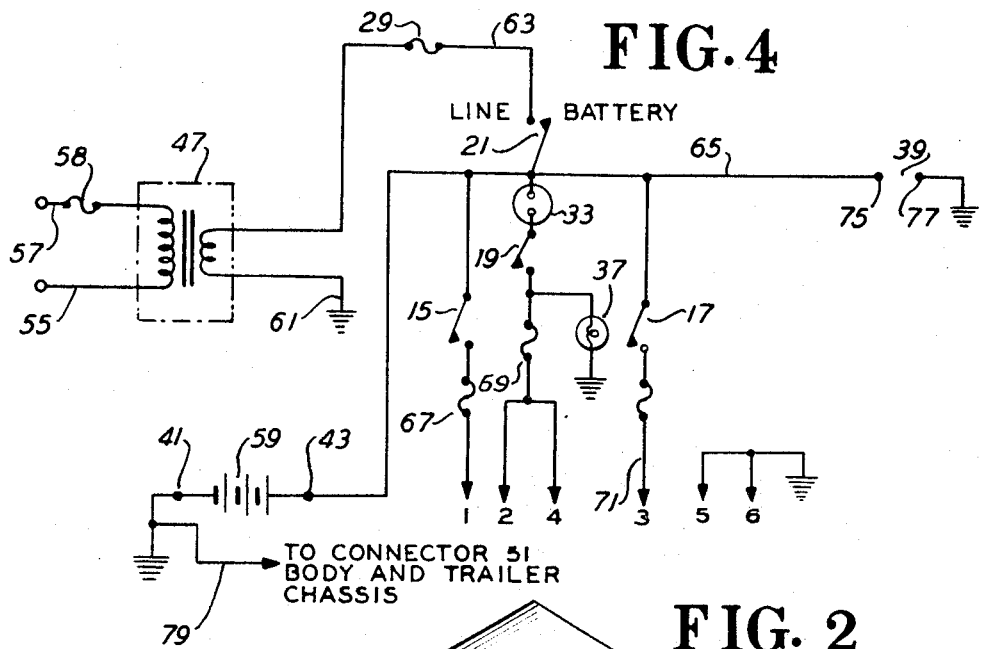
FIG. 4 is a simplified electrical schematic diagram for the circuit utilized in the apparatus of FIGS. 1 through 3 herein.

In FIG. 4 herein, a simplified electrical schematic diagram is set forth for the apparatus appearing in FIGS. 1 through 3. As seen therein, the transformer 47 is connected at one side thereof to 110 volt line power via connectors 55, 57, which may be fused as at 58. The same said connectors are seen in part in FIG. 3 where a portion of the cord 40 bearing such connectors appears. Assuming that line power is thus utilized, the cord 40 of FIG. 3 typically is joined to a suitable extension cord which may be appropriately connected at any point in the yard or similar area in which the trailers being tested are stationed. Where line power is thus utilized, it will be appreciated that the 12 volt storage battery shown at 59 between terminals 41 and 43 is not usually present. However, such battery 59 is shown in FIG. 4 for purposes of completeness. It may be observed that an important advantage of utilizing line power as opposed to a storage battery such as at 59 is that one need not provide for hauling about of the usually extremely heavy and bulky body presented by such storage battery. Assuming that line power is thus utilized, the switch 21 is placed in its closed position so that the transformer secondary, one side of which is grounded at 61, is connected via the fuse 29 and through a conductor 63 into the common line 65. The said common line 65 is seen to be in contact with the several parallel circuits in which switches 15, 17 and 19 are located. It may also be noted that where switch 21 is placed in its open position, the circuit is appropriately arranged for use with a battery such as at 59, that is to say that under these circumstances, the battery via connector 43 is connected to common lead 65.

Each of the parallel branches 67, 69 and 71 are seen to connect to appropriate of the several pins labeled for illustration pins 1 through 6 within bayonet connector 51. Each of the said pins, (with the exception of pins 5 and 6—which are grounded), in turn, connects at the mating trailer receptacle with one of the circuits being tested by the apparatus. Depending then upon the position of the various toggle switches, 15, 17 and 19, the said parallel branches are connected to such of the circuits as is desired to be tested. Assuming for example, one wishes to test the marker lights, it is only necessary to close switch 15, whereupon power is supplied through pin 1 to the marker lights of the trailer. It will be noted that in the case of branch 69, two pins, 2 and 4, are activated, each pin being associated with the "Right" or "Left" turn lights, respectively.

In accordance with the preferred embodiment of the present invention, simplification of the present circuits is achieved by not generally including direct indicator means for establishing completion of the circuits being tested. Rather, such circuits are intended to directly supply power to the portions of the trailer desired to be tested, upon which the observer visually inspects the appropriate portion of the trailer to determine the state of the lighting within such circuits. Thus, for example, having closed the switch 15, the user of apparatus 9 proceeds to visually examine the marker lights of the trailer in order to determine their operability. In the case of branch 69, moreover, as has previously been indicated, a bulb 37 is placed in a branch that is in parallel with the test branch 69 and goes to ground, so that such branch , as it is in series with flasher 33, is operative even if the directional signal circuit being tested is inoperative.

This arrangement, therefore, also enables one to test flasher units in the apparatus 9 by merely inserting the units to be tested into receptacle 35, with switch 19 closed.

It is noted that the common lead 65 is also connected to the bulb testing station 39. It is seen here that the pair of terminals 75 and 77 are available for testing light bulbs. In the simplest instance, as shown for example in FIG. 1, the terminals 75 and 77 may merely comprise a pair of flexible bare wires 78 which are covered with suitable caps 80 when not in use. Since the potential present at such points is relatively low, no danger is involved in a user of the apparatus contacting the appropriate portions of a bulb desired to be tested directly with the bare wires once they are uncovered. It is also within the province of the invention for the testing station to include any simple receptacles, such as are known in the art to be utilized for testing low-voltage bulbs as are incorporated into the present lighting systems.

Finally, it may be noted from the schematic diagram of FIG. 4 that a lead 79 is shown from connector 51 to a ground point. This lead is merely placed in the present diagram in order to illustrate the fact that a firm and positive ground is provided in accordance with the present invention between apparatus and ground via the connector 51 and that such ground connection also includes the trailer chassis itself, which is in common connection with the connector 51 body, and the other grounds of apparatus 9.

In FIGS. 2 and 3 herein, a perspective and side elevational views appear in which the technique for operative association of bayonet connector 51 with receptacle 83 of the trailer is shown, FIG. 2 showing apparatus 9 and receptacle 83 prior to such association. As has previously been indicated, receptacle 83 is of standard construction, as is the mating connecting end of connector 81. Having thus raised the shielding cover 85, the user of the test apparatus firmly inserts the bayonet connector 51 so that a firm connection is established between the pins present at receptacle 83 and the corresponding recesses within the bayonet connector. This having been effected full electrical connection is achieved between apparatus and trailer and moreover, physical support for the apparatus in its connected position is achieved by the relatively rigid connection provided between bayonet connector and receptacle. It will further be appreciated that having thus associated the test apparatus and trailer, a face 39 of apparatus 9 bearing all controls and observation points on the apparatus, faces outward from the trailer being tested, a fully convenient position for observation and manipulation by the user. Furthermore, however, it will be appreciated that a firm and positive grounding connection is achieved between the testing apparatus 9 and the body of the trailer via the metallic outer shell of connector 51 which is now in direct and supporting contact with conductive portions of receptacle 83.

Figure 5:
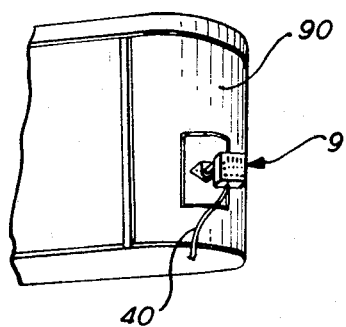
FIG. 5 is a fragmentary perspective view of the front end of a trailer, with the apparatus of the invention connected thereto.

The fragmentary view of FIG. 5 depicts the front end of a trailer 90 with the apparatus 9 secured thereto. Consideration of the actual size of the trailer will make evident the high degree of portability of apparatus 9. Similarly, it will be apparent that the actual height of the apparatus above ground is such as to be at an appropriate level for the aforementioned observation and switch manipulation.

While the present invention has been particularly set forth in terms of specific embodiments thereof, it will be understood in view of the instant disclosure, that numerous variations upon the invention are now enabled to those skilled in the art, which variations in propriety yet reside within the scope of the instant teaching. Accordingly, the invention is to be broadly construed and limited only by the scope and spirit of the claims now appended hereto.

I claim:

1. Apparatus for testing the electrical circuitry of trailers of the type utilized in the trucking industry comprising in combination:

a generally enclosed chassis, one side of which carries plurality of switches for actuating the circuits to be tested a bayonet connector projecting from the side of the chassis opposite said switch carrying side, said connector being adapted for mating with the power receptacle at the end of the trailer being tested, said connector having a metallic outer shell making electrical grounding contact with said trailer upon engagement of said connector and said trailer power receptacle, said connector being mechanically joined to said chassis so as to support said apparatus with said switches facing outwardly from said trailer when said connector and receptacle are mated;

a plurality of test circuits in said chassis connectable to said circuits be tested at said trailer by closing of selected of said switches;

powering means for providing an electrical potential to said plurality of circuits whereby to enable said tests, said means including a step-down transformer mounted at said chassis and connectable to line power; and switch means at said chassis for selectively connecting said plurality of circuits to the output of said step-down transformer or to the output of a storage battery external to said apparatus, whereby said apparatus may alternatively be powered by said line current, or by said storage battery.

2. Apparatus according to claim 1 further including a bulb testing station mounted on said chassis and connected to said power source for testing light bulbs brought to said station.

3. Apparatus according to claim 2 wherein said bulb testing station comprises a pair of flexible conductors, the uninsulated ends of which are normally covered by removable cap elements.

4. Apparatus according to claim 1 wherein one of said plurality of said circuits is connected to the pins on said bayonet connector associated with the directional signal circuit to be tested on said trailer and includes a receptacle for a flasher unit connected in series with the circuit being tested, said circuit including a branch to ground, which is in parallel with said directional signal circuit and has in series with said flasher unit a light bulb, whereby by switching said circuit to an "On" position, said parallel branch is enabled through said flasher unit whereby said flasher units may be tested by mounting thereof in said receptacle.

5. Apparatus according to claim 1 wherein said plurality of circuits includes separate circuits for testing marker, stop light, and directional signal light portions of said trailer lighting system.

6. Apparatus according to claim 1 wherein said bayonet connector projects at right angles from said chassis, terminating at a point clear of any components mounted on said side of said chassis, whereby to enable mating with said trailer receptacle with said chassis and components mounted thereupon removed from contact with the said trailer, and with all of said apparatus controls and indicators accessible and visible to an operator.

* * * * *